(12) United States Patent
Birmiwal et al.

(10) Patent No.: US 10,333,790 B2
(45) Date of Patent: Jun. 25, 2019

(54) METHOD AND SYSTEM FOR SELECTIVE ROUTE DOWNLOAD IN NETWORK DEVICES

(71) Applicant: Arista Networks, Inc., Santa Clara, CA (US)

(72) Inventors: Sharad Birmiwal, Burnaby (CA); Rakesh Guttikonda, Hackensack, NJ (US); Akshay Gattani, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 156 days.

(21) Appl. No.: 14/983,862

(22) Filed: Dec. 30, 2015

(65) Prior Publication Data

US 2017/0195181 A1 Jul. 6, 2017

(51) Int. Cl.
*H04L 12/24* (2006.01)
*H04L 12/751* (2013.01)

(52) U.S. Cl.
CPC .............. *H04L 41/12* (2013.01); *H04L 45/02* (2013.01)

(58) Field of Classification Search
CPC ................................ H04L 41/12; H04L 12/24
See application file for complete search history.

(56) References Cited

U.S. PATENT DOCUMENTS

| | | | |
|---|---|---|---|
| 2007/0121524 A1* | 5/2007 | Rangarajan | H04L 45/02 370/252 |
| 2010/0150155 A1* | 6/2010 | Napierala | H04L 45/00 370/390 |
| 2013/0121331 A1* | 5/2013 | Vasseur | H04W 40/14 370/351 |
| 2013/0266007 A1* | 10/2013 | Kumbhare | H04L 45/56 370/389 |
| 2015/0016456 A1* | 1/2015 | Ramanathan | H04L 45/306 370/392 |
| 2015/0263952 A1* | 9/2015 | Ganichev | H04L 41/0813 370/389 |
| 2017/0063633 A1* | 3/2017 | Goliya | H04L 41/12 |
| 2017/0126475 A1* | 5/2017 | Mahkonen | H04L 41/0631 |

OTHER PUBLICATIONS

Chandra et al., BGP Communities Attribute, Network Working Group, Aug. 1996, Request for Comments: 1997.*

* cited by examiner

*Primary Examiner* — Shailendra Kumar
(74) *Attorney, Agent, or Firm* — Chamberlaine, Hrdlicka, White, Williams & Aughtry

(57) ABSTRACT

A method for selective route download (SRD) in network devices. The method includes obtaining, by a network device, a first SRD route selection list. The method further includes identifying a first route to be installed in the FIB, based on the first SRD route selection list, including making a first determination that a route map, based on the SRD route selection list, includes route map changes that are exclusively attributed to the SRD route selection list. Identifying the first route further includes making a second determination that the route map changes are exclusively expressed using a prefix list, and based on the first and the second determinations, selecting the first route from a border gateway protocol (BGP) routing information base (RIB), by processing only routes in the BGP RIB that have prefixes matching changed prefixes in the prefix list. The method also includes updating the FIB with the first route.

17 Claims, 6 Drawing Sheets

METHOD AND SYSTEM FOR SELECTIVE ROUTE DOWNLOAD IN NETWORK DEVICES

BACKGROUND

Network devices such as routers or multilayer switches are network devices that are used to manage the flow of data between networks, connected by the network devices. A network device may rely on a forwarding information base (FIB) to manage the flow of data between networks.

SUMMARY

In general, in one aspect, the invention relates to a method for selective route download in network devices. The method includes obtaining, by a network device, a first selective route download (SRD) route selection list from an SRD controller. The SRD route selection list provides instructions for the network device to identify routes to be installed in the forwarding information base (FIB) of the network device. The method further includes identifying, by the network device, a first route to be installed in the FIB, based on the first SRD route selection list, including making a first determination that a route map, based on the SRD route selection list, includes route map changes that are exclusively attributed to the SRD route selection list. Identifying the first route to be installed in the FIB further includes making a second determination that the route map changes are exclusively expressed using a prefix list, and based on the first and the second determinations, selecting the first route to be installed in the FIB from a border gateway protocol (BGP) routing information base (RIB), by processing only routes in the BGP RIB that have prefixes matching changed prefixes in the prefix list. The method further includes updating the FIB of the network device with the first route to be installed in the FIB.

In general, in one aspect, the invention related to a network device. The network device includes a routing information base (RIB) agent, a border gateway protocol (BGP) RIB and a forwarding information base (FIB). The network device obtains a first selective route download (SRD) route selection list from an SRD controller. The SRD route selection list provides instructions for the network device to identify routes to be installed in the FIB of the network device. The network device identifies a first route to be installed in the FIB, based on the first SRD route selection list The network device makes a first determination that a route map, based on the SRD route selection list, includes route map changes that are exclusively attributed to the SRD route selection list. The network device makes a second determination that the route map changes are exclusively expressed using a prefix list. Based on the first and the second determinations, the RIB agent selects the first route to be installed in the FIB from the BGP RIB, by processing only routes in the BGP RIB that have prefixes matching changed prefixes in the prefix list. The network device updates the FIB of the network device with the first route to be installed in the FIB.

In general, in one aspect, the invention related to a non-transitory computer readable medium including instructions that enable a network device to obtain a first selective route download (SRD) route selection list from an SRD controller. The SRD route selection list provides instructions for the network device to identify routes to be installed in the forwarding information base (FIB) of the network device. The instructions further enable the network device to identify a first route to be installed in the FIB, based on the first SRD route selection list by making a first determination that a route map, based on the SRD route selection list, includes route map changes that are exclusively attributed to the SRD route selection list, by making a second determination that the route map changes are exclusively expressed using a prefix list, and by, based on the first and the second determinations, selecting the first route to be installed in the FIB from a border gateway protocol (BGP) routing information base (RIB), by processing only routes in the BGP RIB that have prefixes matching changed prefixes in the prefix list. The instructions also enable the network device to update the FIB of the network device with the first route to be installed in the FIB.

DETAILED DESCRIPTION

Figure 1:
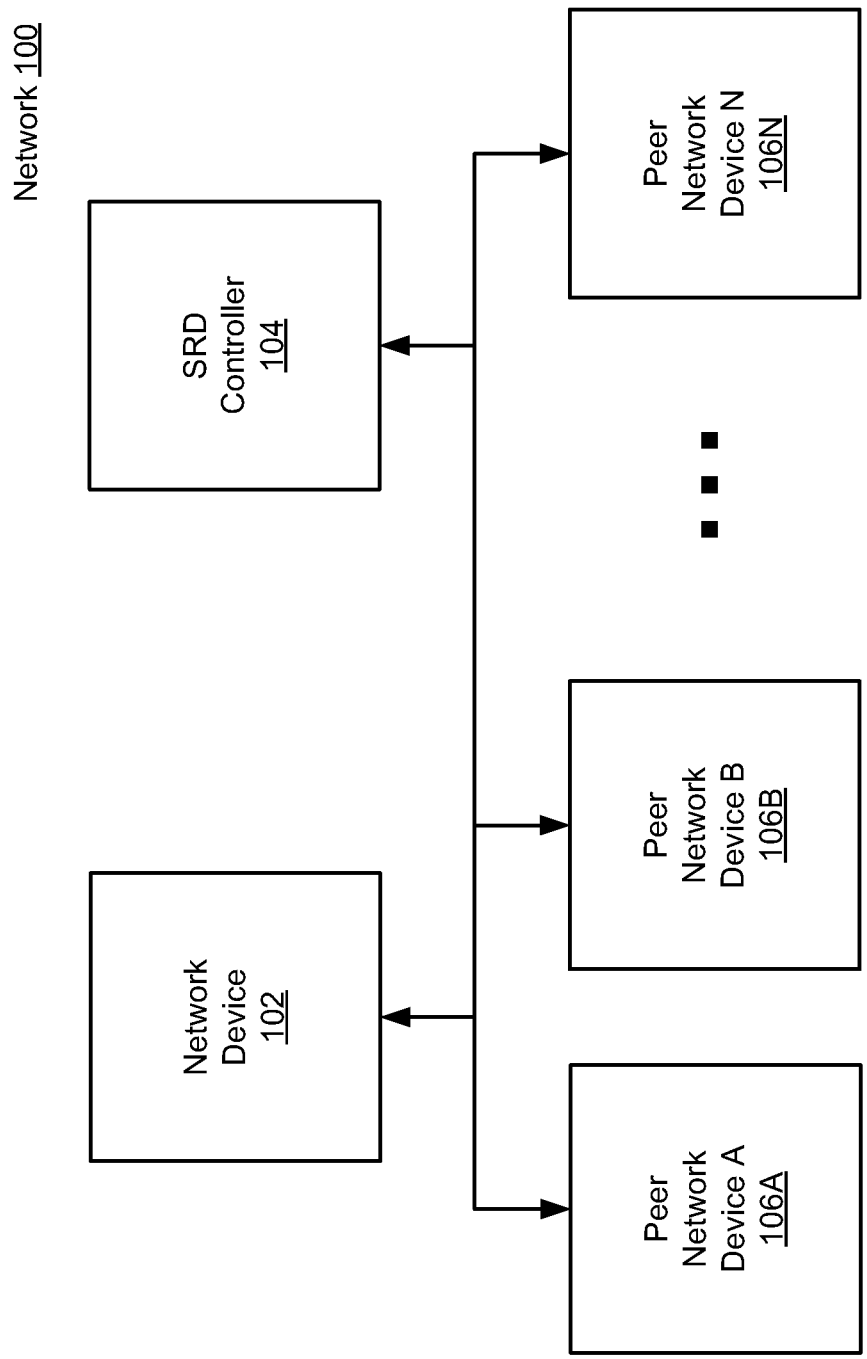
FIG. 1 shows a network in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for selective route downloading in network devices. More specifically, in one or more embodiments of the invention, network devices such as routers and multi-layer switches may rely on a forwarding information base (FIB) to route layer 3 data packets. A network device may receive a data packet, and based on the destination IP address (which may be and IPv4 or an IPv6 address) specified in the data packet, the network device may decide to which other network device the data packet is to be forwarded. The resolution of the next hop, i.e., the next network device that receives the data packet, may be performed based on a comparison of the IP address of the data packet with destination prefixes of routes installed in the FIB. In one or more embodiments of the invention, the FIB includes a list of routes including destination prefixes, i.e., identifiers of subnets, along with reachability information, including the outgoing interface of the network device, and the next hop toward the subnet, for each route entry. A FIB may store multiple routes, for example, routes for Internet prefixes commonly required by network traffic, processed by the network device. When the network device receives an incoming data packet, the network device identifies the destination IP address, and then locates a suitable route, based on a matching destination prefix in the FIB, and subsequently sends the data packet to the corresponding next hop, via the specified outgoing interface. In one or more embodiments of the invention, many routes for many destination prefixes may be known to the network device. However, network devices in accordance with one or more embodiments of the invention may not download all known routes to the FIB. The FIB of the network device may, for example, not have sufficient capacity to store all routes known to the network device. Alternatively or in addition, multiple network devices may coordinate the routing of incoming traffic to increase performance. For example, one network device may process only traffic directed to destination IP addresses requiring certain routes and may therefore only need to have a subset of routes installed in the FIB, whereas other network devices may process other traffic directed to other destination IP addresses. These other network devices may therefore have other subsets of routes, serving these other destination IP addresses, installed in their respective FIBs. In one or more embodiments of the invention, routes for destination prefixes may therefore be selectively downloaded to the FIB of a network device. A selective route download (SRD) controller may select the destination prefixes for which to install routes in the FIB of the network device, and the network device may then determine routes suitable for reaching the destination prefixes, to be installed in the FIB.

The following description describes embodiments of the invention in which the network devices are routers and/or multilayer switches using the border gateway protocol (BGP). However, the invention is not limited to routers and multilayer switches using BGP. Rather, embodiments of the invention may be extended to include any network devices using any kind of routing protocol. Further, the invention is equally applicable to various layer 3 protocols, including IPv4 and IPv6.

FIG. 1 shows a network in accordance with one or more embodiments of the invention. The network (100) may include a network device (102), a selective route download (SRD) controller (104) and peer network devices A-N (106A-106N). Each of these components is described below.

The network device (102), in accordance with one or more embodiments of the invention, is a router or a multilayer switch that connects to other network devices, e.g., peer network devices A-N (106A-106N). The network device (102) and at least one of the peer network devices A-N (106A-106N) use the border gateway protocol (BGP) to exchange routing information including known available routes, network topology information, etc. The network device (102) may further connect to one or more other networks (not shown), thereby enabling the exchange of data between the network (100) and the other network(s), using the routing capabilities of the network device (102). The network device (102) is further described below with reference to FIG. 2.

The SRD controller (104), in accordance with one or more embodiments of the invention, is a computing device configured to determine the destination prefixes to be programmed into the FIB of the network device (102). In addition, the SRD controller may determine destination prefixes to be programmed into the FIB(s) of one or more of the peer network devices A-N (106A-106N). The selection of destination prefixes by the SRD controller (104) and the programming of the destination prefixes into the FIB of the network device (102) is described below, with reference to FIGS. 3-6. The SRD controller, in accordance with an embodiment of the invention, may be any type of computing device capable of executing one or more of the steps described below with reference to FIG. 4. The SRD controller may be, for example, a server, a component of the network device (102) or a component of one of the peer network devices A-N (106A-106N).

The peer network devices A-N (106A-106N) may be routers or multilayer switches connected to the network device (102) via the network (100). In one or more embodiments of the invention, one or more of the peer network devices support BGP and exchange routing information, e.g., known available routes, with the network device (102). In one embodiment of the invention, one or more of the peer network devices A-N (106A-106N) implement SRD similar or identical to the SRD implementation on the network device (102), as described below.

Figure 2:
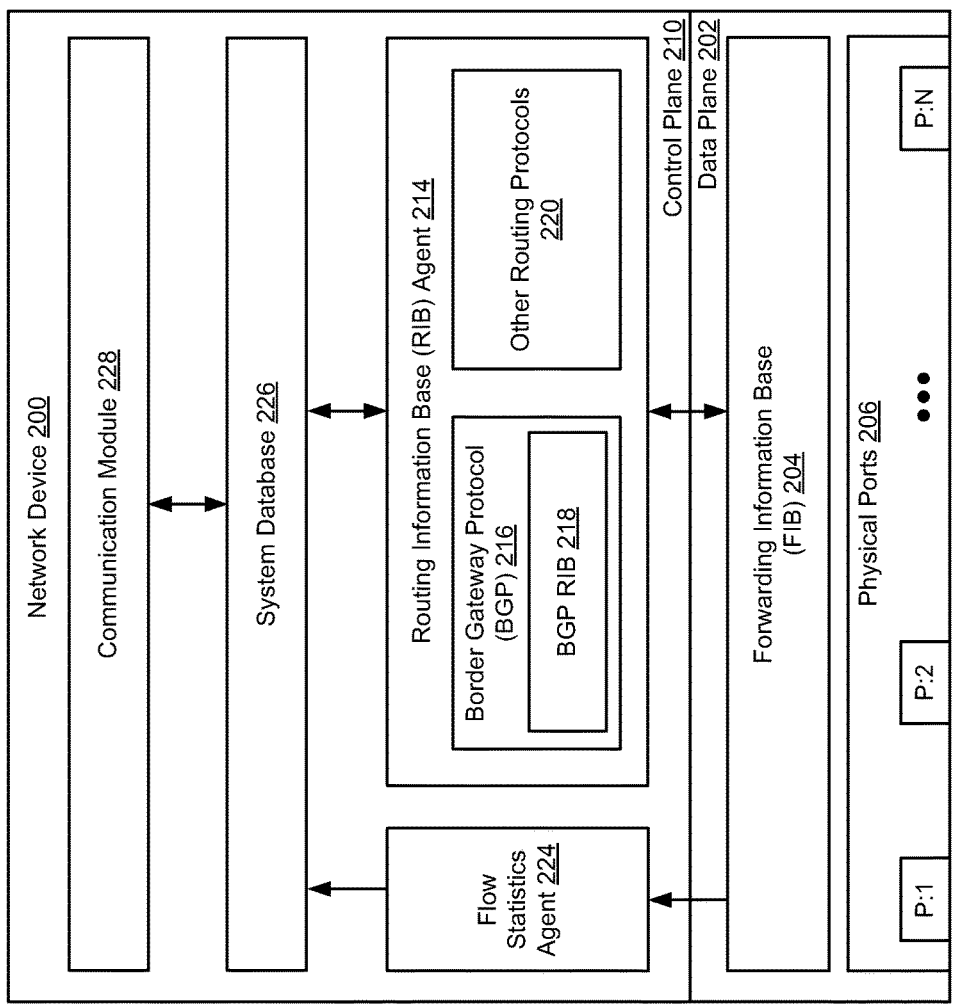
FIG. 2 shows a network device in accordance with one or more embodiments of the invention.

FIG. 2 shows a network device (200) in accordance with one or more embodiments of the invention. The network device (102) and one or more of the peer network devices A-N (106A-106N), shown in FIG. 1, may be network devices similar to the network device (200).

In one embodiment of the invention, the network device (200) is a network device such as a router or a multilayer switch. Accordingly, the network device (200) may include layer 3 routing capabilities. In one or more embodiments of the invention, the network device (200) includes executable instructions (stored on a non-transitory computer readable medium (not shown)) and hardware (e.g., a processor, memory, persistent storage, etc. (not shown)), configured to receive data packets from other network devices or computing devices, process the data packets, and send the data packets to other network devices or computing devices.

In one embodiment of the invention, the network device (200) includes a data plane (202) and a control plane (210). The data plane (202) may include components of the network device that process incoming data packets, retrieve the destination IP address of each incoming data packet, and select, based on the destination IP address, a route for the data packet and send the data packet to the next hop of the route. The routes, used by the network device for the routing of the data packets, may be stored in the FIB (204) of the network device. The FIB, in accordance with one or more embodiments of the invention, may be hardware optimized for high-speed lookups of routes, thus enabling rapid forwarding of data packets to the next hop. The FIB may thus include memory to store route entries, each entry including at least a destination prefix, an outgoing interface, and an address (e.g., a media access control (MAC) address) of the next hop.

The data plane may further include the physical ports (206). The physical ports may physically connect the network device to other network devices, enabling the network devices to exchange data packets, routing information, etc. The physical ports may be, for example, electrical and/or optical Ethernet ports.

The control plane (210), in accordance with one or more embodiments of the invention, governs the behavior of the network device, i.e., the routing decisions that are being made in the data plane. The control plane may gather information about available routes and may, based on the knowledge of available routes, program the FIB (204) in the data plane (202). More specifically, the control plane, in accordance with one or more embodiments of the invention, implements functionality for selective route download, as instructed by the SRD controller (104), further described in detail below, with reference to FIGS. 3-6. Accordingly, at least some of the routes, installed in the FIB (204) may be routes selected by the SRD controller.

The control plane (210), in accordance with one or more embodiments of the invention, includes a routing information base (RIB) agent (214) that gathers available routes. The routing information base (RIB) agent may obtain routes that are statically programmed, e.g., by a network device administrator. The routing information base agent may further obtain routes shared by peer network devices, by exchanging known routes with these peer network devices. The exchange of routes may be performed using various routing protocols, e.g., the border gateway protocol (BGP), open shortest path first (OSPF), etc. The routing information base agent (214), in accordance with one or more embodiments of the invention, further selects the routes to be programmed into the FIB (204). The selection may be governed by input from the SRD controller (104), as further described below.

In one or more embodiments of the invention, the RIB agent (214) includes or interfaces with an implementation of the border gateway protocol (216). The RIB agent (214) may further include or interface with other routing protocols (220), which may include, but are not limited to, open shortest path first (OSPF), routing information protocol (RIP) and intermediate system to intermediate system (IS-IS). The network device may use one or more of these routing protocol implementations in order to learn routes from peer network devices that also support one or more of these routing protocols. Further, the RIB agent (214) may select, from all routes received using one or more routing protocols, including BGP, routes to be programmed into the FIB (204). In one or more embodiments of the invention, the selection of routes may be affected by the SRD controller's selection of routes to be programmed. More specifically, routes selected by the SRD controller may be programmed into the FIB and routes not selected by the SRD controller may not be programmed into the FIB. The RIB agent may further advertise the routes programmed into the FIB to the peer network devices, for example, using BGP.

In one or more embodiments of the invention, an implementation of BGP (216) is executing in the RIB agent (214), or alternatively, is reachable by the RIB agent. The network device (200) may use BGP to communicate with peer BGP network devices in order to learn available routes from the peer BGP network devices and in order to advertise routes installed in the FIB to the peer BGP network devices. BGP is a standardized protocol, described by the IETF document RFC 4271, designed to exchange routing and reachability information between network devices.

In one or more embodiments of the invention, BGP routes that may potentially be programmed into the FIB of the network device are stored in the BGP RIB (218). The BGP RIB (218) is populated with static routes, preprogrammed into the network device e.g. by a network device administrator, complemented by routes received from peer network devices, as previously described with reference to FIG. 1. The BGP RIB (218) may include routes for various destination prefixes. Each route may include attributes, such as the AS path, among others.

The AS path may specify which autonomous systems a data packet would have to travel through to reach the destination. Each autonomous system (AS) in an AS path may be represented by, for example, either two or four bytes.

Depending on the number of routes stored in the BGP RIB, and depending on the length of the AS paths associated with the routes, significant memory resources may be required to accommodate these AS paths in the BGP RIB (218), particularly if the autonomous systems are represented by four bytes.

In one embodiment of the invention, the format used to store the AS path of a route therefore uses a two byte representation to store all autonomous systems of an AS path if all autonomous systems listed in the AS path are encoded by two bytes. If at least one of the autonomous systems of an AS path uses a four byte encoding, all autonomous systems of the AS path are stored using a four byte representation. A flag may be used to distinguish an AS path using four byte AS representation from an AS path using two byte AS representation In an alternative embodiment of the invention, mixed two and four byte representations may be used within an AS path. A two-byte-encoded AS may be represented by two bytes, accompanied by a flag indicating two-byte encoding, whereas a four-byte-encoded AS may be represented by four bytes, accompanied by a flag indicating four byte encoding.

In order to enable the SRD controller to select routes, the RIB agent, in accordance with one or more embodiments of the invention, provides route information, e.g., BGP RIB content, to the SRD controller. The steps performed by the routing information base agent to select routes to be written to the FIB, and the processing of these routes is described in detail below, with reference to FIGS. 3-6.

In one or more embodiments of the invention, the network device may use the flow statistics agent (224) to determine traffic flows experienced by the network device in the data plane (202). The flow statistics agents may monitor all traffic encountered by the data plane, or may selectively sample traffic. In one embodiment of the invention, the flow statistics agent may obtain destination IP addresses of data packets being routed by the network device, and may count, separately for each encountered destination IP address, the number of data packets encountered. The flow statistics may be obtained using data packet sampling, for example, sFlow®, NetFlow®, and/or any alternative data packet sampling software, capable of obtaining at least destination IP addresses of data packets, processed by the network device. The flow statistics may then be periodically reported to the SRD controller. The flow statistics may be reported via the communication module (228). In one embodiment of the invention, the flow statistics agent (224) further, for each destination IP address reported to the SRD controller, gathers route information from the RIB agent (214). More specifically, the flow statistics agent (224) may communicate with the RIB agent to obtain routes with prefixes suitable to route a data packet toward the destination IP address.

Continuing with the discussion of the network device (200), in one or more embodiments of the invention, the communication module (228) provides an interface for processes of the network device, e.g., the routing information base agent (214) and the flow statistics agent (224), to communicate with the SRD controller (104). The communication module may send flow statistics information provided by the flow statistics agent (224) and route information provided by the RIB agent (214) to the SRD controller (104). Different communication methods may be supported by the communication module. In order to send flow data and route information, the communication module may use any type of network communication, supported by the SRD controller. For example, route information may be provided via BGP updates that may also include BGP attributes such as AS paths, next hops, etc, if suitable BGP protocol extensions are used. Also, as previously noted, flow statistics may be provided using, for example, sFlow® NetFlow® or other data packet sampling protocols. Similarly, in order to receive SRD route selection lists, i.e., instructions that enable the network device to identify routes to be installed in the FIB from the SRD controller, any type of network communication, supported by the SRD controller may be used. An SRD route selection list may be, for example, a prefix list that specifies prefixes for which routes are to be installed in the FIB. Alternatively, an SRD route selection list may be a BGP community list, an AS path list, etc. Those skilled in the art will appreciate that any criteria suitable for limiting a choice of routes to be installed in the FIB may be used in the SRD route selection list. In one embodiment of the invention, a file, hosted by the network device, may be used to store the SRD route selection lists generated by the SRD controller. The SRD controller may write an SRD route selection list into the file on the network device, and the communication module may subsequently access the file in order to obtain the SRD route selection list and to provide it to the RIB agent, where it may be used to decide what routes to install in the FIB. In an alternative embodiment, the SRD controller may supply SRD route selection list entries using command line syntax supported by the network device. A command may, for example, specify an individual prefix or batches of prefixes to be installed in the FIB. Alternatively, an application program interface (API) provided by the communication module of the network device may be used to enable the SRD controller to provide an SRD route selection list to the RIB agent. Those skilled in the art will recognize that the communication module is not limited to providing above described mechanisms for communication with the SRD controller. Any communication method, that enables the network device to provide flow statistics, obtained from the data plane, and routing information, obtained from the control plane, to the SRD controller, and to receive SRD route selection lists from the SRD controller, may be used without departing from the invention.

The routing information base agent (214), the flow statistics agent (224) and the communication module (228), may be hosted by a network device operating system (not shown), executing on a CPU (not shown) of the network device. The control plane (210) may further include a system database (226). In implementations using a system database, the system database may coordinate the interaction of different modules of the network device. For example, exchanges between the communication module and the routing information base agent and between the communication module and the flow statistics agent may occur via the system database, rather than directly. The system database may maintain a representation of multiple or all states of the network device, for example in volatile memory (e.g. RAM of the network device). Modules of the network device may be communicating using a publish/subscribe model, i.e., a module providing information may write the information to the system database, and subsequently the system database may publish the information to other modules that have subscribed to the information. Accordingly, the system database may synchronize states between modules without a direct coupling of the modules, thereby enabling these modules to operate asynchronously.

One skilled in the art will recognize that the architecture of a network device is not limited to the components shown in FIG. 2. For example, the network device may include processors or memory not shown in FIG. 2. Further, other routing protocols may include additional routing tables from which routes may be chosen to be installed in the FIB, without departing from the invention.

FIGS. 3-6 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-6 may be performed in parallel with any other steps shown in FIGS. 3-6 without departing from the invention.

Figure 3:
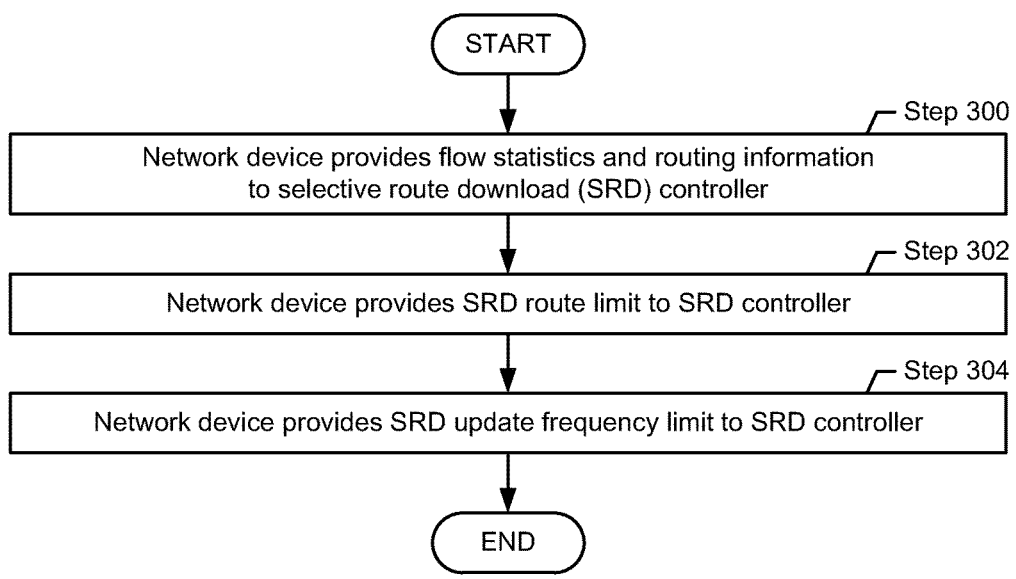
FIG. 3 shows a flowchart in accordance with one or more embodiments of the invention.

FIG. 3 shows a method for communicating flow statistics and routing information data to the SRD controller. In one embodiment of the invention, the method may be executed not only by the network device but also by peer network devices. The provided data may enable the SRD controller to generate an SRD route selection list. The method, in accordance with an embodiment of the invention, is performed periodically, either at regular time intervals, or event-triggered, e.g., upon collection of sufficient data to be communicated to the SRD controller.

Turning to FIG. 3, in Step 300, the network device provides flow statistics and routing information data to the SRD controller. The flow statistics may originate from the data plane of the network device, whereas the routing information may originate from the control plane of the network device. As previously described, the flow statistics may include destination IP addresses of data packets processed by the network device. For each of the reported destination IP addresses, there may be a count that represents the number of data packets that have been addressed to the destination IP address. The flow statistics may further include routes obtained from the BGP RIB, suitable for reaching the destination IP addresses. These routes may be suitable for sending data packets toward their destination IP addresses. Alternatively, the routes may not be included in the flow statistics, but may be separately provided by the RIB agent. The RIB agent may provide all routes stored in the BGP RIB, or a subset of routes, for example, only routes with destination prefixes suitable for reaching the destination IP addresses provided with the flow statistics. Further, the RIB agent may also provide additional information such as BGP attributes.

The flow statistics and routing information may be provided by the network device either periodically, or upon a trigger event causing the sending of these data to the SRD controller. Alternatively, the data may be delivered to the SRD controller upon request by the SRD controller.

In Step 302, the network device provides an SRD route limit to the SRD controller. The SRD route limit, in accordance with an embodiment of the invention, is provided to the SRD controller to notify the SRD controller of route storage capacity limits in the FIB of the network device. The SRD route limit may be set such that the number of destination prefixes that the SRD controller instructs the network device to install in the FIB does not exceed the capacity of the FIB. In one embodiment of the invention, the administrator may specify the limit. In an alternative embodiment, the limit is detected by the network device, based on the storage available for destination prefixes in the FIB.

In Step 304, the network provides an update frequency limit to the SRD controller in order to limit the update rate at which the SRD controller is allowed to send SRD route selection lists, thereby preventing the SRD controller from causing excessive processing loads on the network device (as described below with reference to FIGS. 5 and 6). Frequent updates may be a result of, for example, quick successions of updates from a BGP peer, quick successions of changes in traffic on the data plane, or a poorly performing SRD controller. Limiting the update frequency of the SRD controller may reduce the excessive processing load on the network device. The update frequency limit may be specified once, e.g., when the method of FIG. 3 is executed the first time. Alternatively, the update frequency limit may be specified periodically, but not necessarily with each execution cycle of the method of FIG. 3. In one embodiment of the invention, the update frequency limit is dynamically adjusted by the network device, based on the load resulting from the processing of SRD route selection lists. If the network device observes an excessive processing load, it may lower the update frequency limit, and once the processing load reduces, the network device may increase the update frequency limit.

Figure 4:
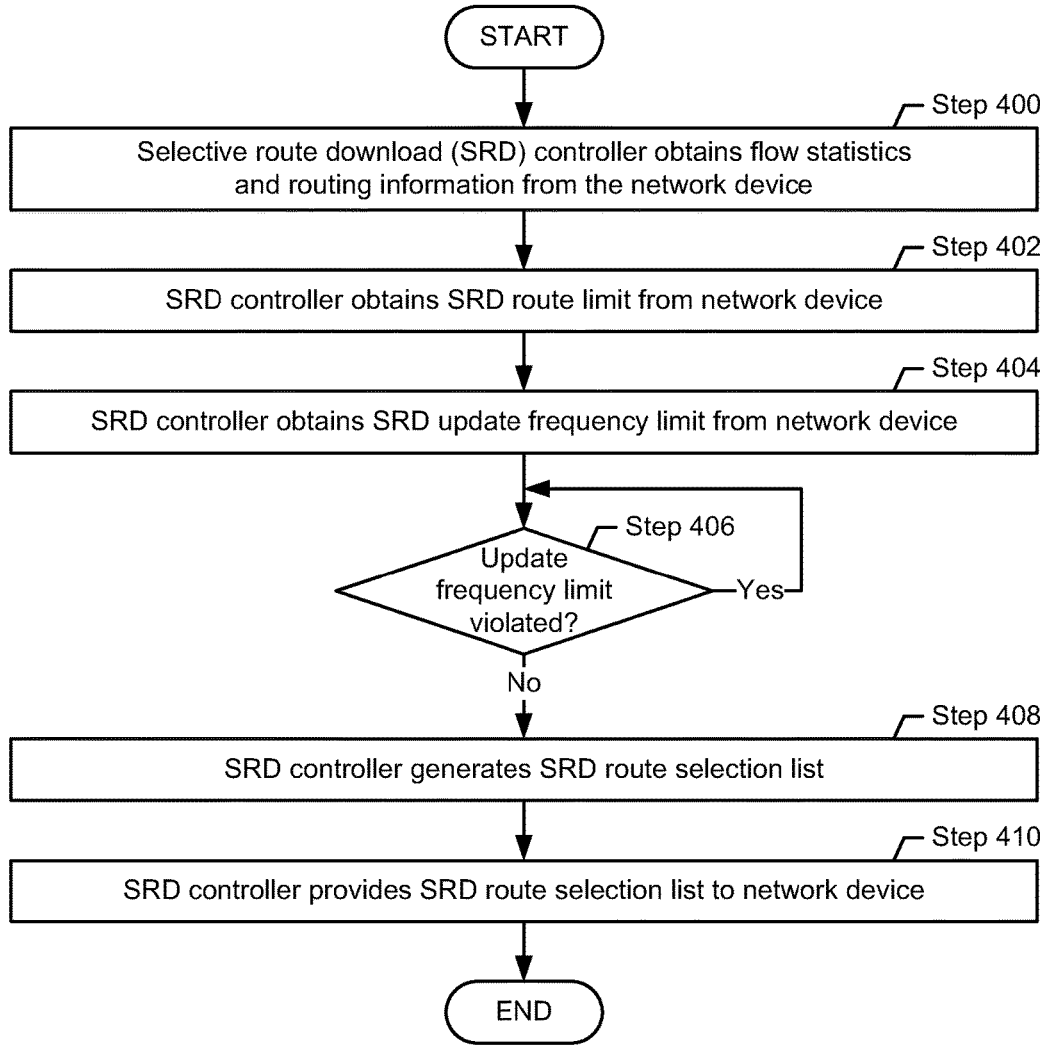
FIG. 4 shows a flowchart in accordance with one or more embodiments of the invention.

FIG. 4 shows a method for generating an SRD route selection list, by the SRD controller. The method, in accordance with an embodiment of the invention, is performed whenever the SRD route controller receives flow statistics and routing information from the network device.

In Step 400, the SRD controller obtains flow statistics and routing information from the network.

In Step 402, the SRD controller obtains an SRD route limit from the network device.

In Step 404, the SRD controller obtains an update frequency limit from the network device.

In Step 406, a determination is made about whether the update frequency limit, obtained in Step 404, is violated. If the providing of the SRD route selection in Step 410 would result in a violation of the update frequency limit (e.g., because updates of flow statistics and routing information are provided by the network device at a high frequency), execution of subsequent Step 408 may be delayed, until the execution frequency of the method described in FIG. 4 is below the update frequency limit. If no violation of the update frequency limit is detected, the method may directly proceed to Step 408.

In Step 408, the SRD controller generates the SRD route selection list. The SRD route selection list may be generated by identifying, for the IP destination addresses, obtained from the flow statistics, routes for destination prefixes suitable for reaching the destination IP addresses. These routes may be identified from the set of routes provided by the network device in Step 400. In one embodiment of the invention, the selected routes are subsequently ranked based on how frequently they would have been used for processing the data packets based on which the flow statistics were generated. A route that is more frequently used may receive a higher ranking than a route that is less frequently used. The SRD controller may then select, based on the ranked routes, a number of suitable destination prefixes to be included in the SRD route selection list. In one embodiment of the invention, the highest ranked routes may be selected, i.e., routes with the highest observed usage may be included in the SRD route selection list.

Those skilled in the art will appreciate that other criteria may be used in addition or alternatively in order to select prefixes to be included in the SRD route selection list. For example, the SRD route selection list may, in addition or alternatively include or exclude next hops in order to establish certain traffic flow patterns. Further, not only data volume (i.e., the number of packets directed to a certain destination IP address), but also the type of traffic (e.g., video streaming data vs other traffic) may be considered in prioritizing routes for which route prefixes are to be added to the SRD route selection list.

The number of destination prefixes to be included in the SRD route selection list may be limited by the SRD route limit, obtained in Step 402. The SRD route limit may be chosen such that the number of entries in the SRD route selection list does not require the installation of a number of routes in the FIB that exceeds the storage capacity of the FIB.

Further, in embodiments of the invention where multiple network devices are interfacing with the SRD controller, the SRD controller may build a separate SRD route selection list for each network device. The routes included in the SRD route selection lists may be selected to balance traffic, to create redundancies, etc. Consider, for example, a scenario in which two network devices are functionally placed in parallel, with both network devices connecting network A to network B. In this scenario, frequently used routes may be distributed between the two SRD route selection lists (i.e., one SRD route selection list per network device) to be sent to the network devices A and B, respectively, in order to distribute traffic between network devices A and B.

An SRD route selection list, in accordance with one or more embodiments of the invention, may be specified in the form of a whitelist or a blacklist. If a whitelist format is used, prefixes for which routes are to be installed in the FIB may be selected, e.g., based on the entries in the SRD route selection list. If a blacklist format is used, routes for any prefixes may be installed in the FIB, with the exception of routes that are covered by the SRD route selection list. The blacklist format may be used for example, when a set of routes from a known pool of routes is to be excluded from the FIB.

An SRD route selection list may further be incremental and may only include entries that have changed in comparison to a previously sent SRD route selection list.

In Step 410, the SRD controller provides the SRD route selection list to the network device. The SRD controller may either send the SRD route selection list to the network device after completion of Step 408, or it may send the SRD route selection list to the network device upon request by the network device.

Figure 5:
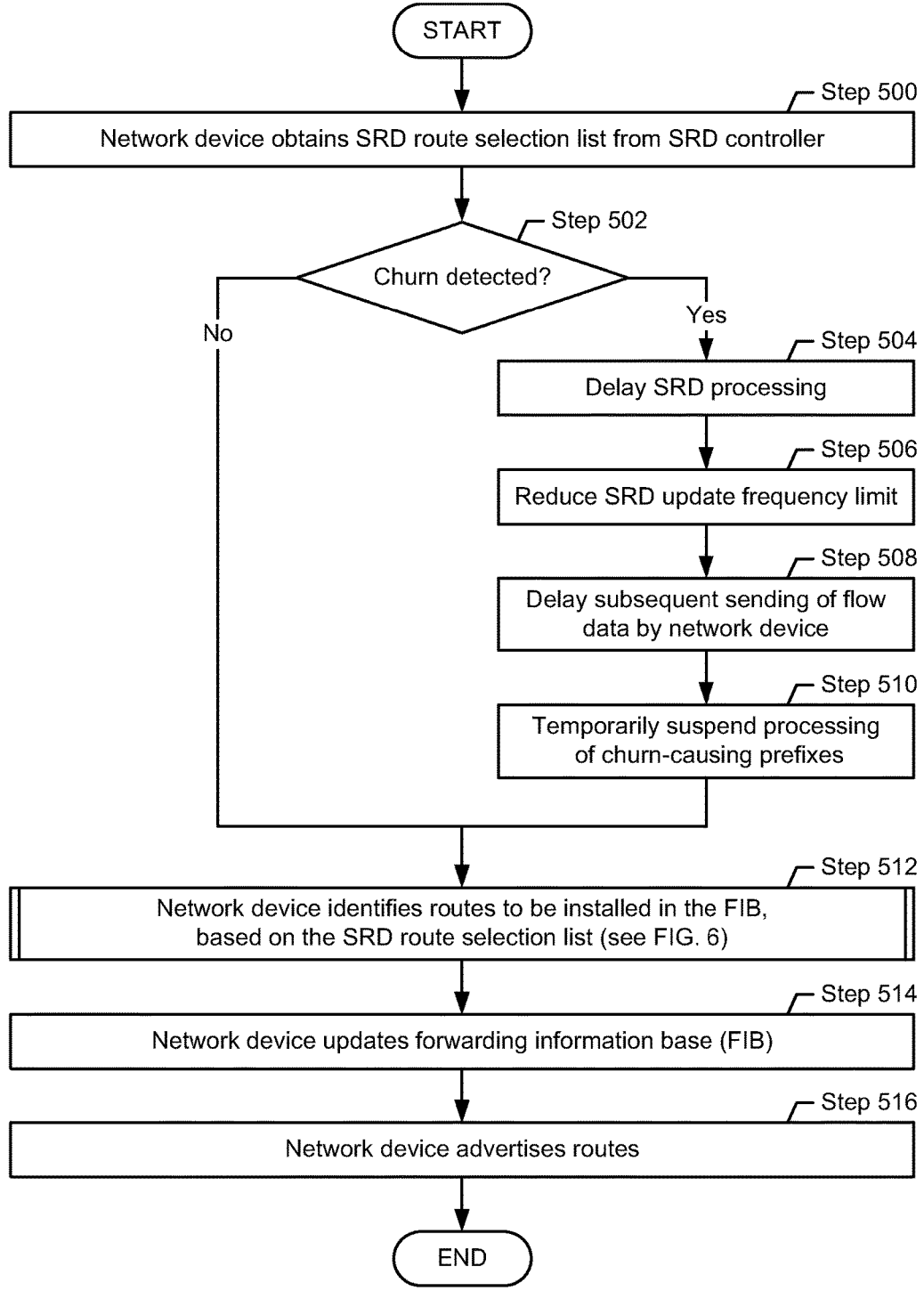
FIG. 5 shows a flowchart in accordance with one or more embodiments of the invention.

FIG. 5 shows a method for updating the FIB of the network device, based on an SRD route selection list received from the SRD controller. The method, in accordance with an embodiment of the invention, is performed each time an SRD route selection list is received from the SRD controller.

In Step 500, the network device obtains the SRD route selection list from the SRD controller. Step 500 corresponds to Step 410 in FIG. 4. The SRD route selection list, in accordance with one or more embodiments of the invention, includes instructions, e.g., in the form of a list, which when interpreted by the network device enable the network device to identify routes to be installed in the FIB and routes to be deleted from the FIB. For example, routes that meet one or more criteria specified in the SRD route selection list may be installed in the FIB, whereas routes that exist in the FIB, but that do not meet one or more criteria specified in the SRD route selection list, may be deleted from the FIB. The instructions in the SRD route selection list may be provided, for example, as a prefix list that specifies prefixes for which routes are to be installed in the FIB. Alternatively or in addition, an SRD route selection list may include a BGP community list, an AS path list, etc. The network device may use a route map to communicate these instructions within the network device. The route map may include the instructions received from the SRD controller in the form of match clauses. For example, there may be one or more match clauses that require prefix matching, there may be one or more match clauses that require AS path matching, and/or there may be one or more match clauses that require BGP community matching, etc. Additionally or alternatively, matching may be performed based on BGP AS numbers, BGP extended communities, IP/IPv6-specific information, BGP local preferences, BGP route metrics, route metric types, and/or based on IDs of the router that originate BGP updates. Further, additional sub-options may be considered. For example, if IP and/or IPv6-specific information is used, the match clauses may also include conditions for IP addresses, IP next hops, and IP resolved next hops. A route may qualify for installation in the FIB if the route meets the criteria specified in one or more of the match clauses of the route map. Those skilled in the art will recognize that the number and types of match clauses is not limited to the above examples. Any number and combination of match clauses may be used to represent the instructions provided by the SRD controller in the SRD route selection list. The SRD route selection list may be received by a communication module of the network device that interfaces with the SRD controller. In one embodiment of the invention, the communication module may derive an incremental SRD route selection list that only includes entries that have changed in comparison to a previously received SRD route selection list. Alternatively, the communication module may pass on a complete SRD route selection list or an incremental SRD route selection list, if the SRD controller provided an incremental SRD route selection list.

In Step 502, a determination is made about whether the network device is experiencing churn. Churn may occur if the SRD controller provides SRD route selection lists in rapid succession, requiring the network device to update the FIB at an unsustainable rate. This may result in a system instability where, as a result of the network device not being able to update one or more FIB entries in a timely manner, the SRD controller issues a successive SRD route selection list that includes entries different from the entries provided in the previously sent SRD route selection list, thereby potentially causing an oscillatory state where FIB entries are being constantly altered. In one embodiment of the invention, churn is detected based on the frequency of route updates provided to the FIB. For example, a route attribute may be used to document, in the BGP-RIB, the most recent occurrence of an addition or removal of the route to the FIB. If less than a specified amount of time has elapsed since the last addition/removal of the route, this may serve as an indication for churn. Alternatively or additionally, the number of route toggles (i.e., subsequent additions and removals of a route) may be tracked using a route attribute. Churn may be detected if, within a specified time, more than a specified number of route toggles have occurred. The detection may be performed for individual routes or groups of routes.

Alternatively, churn may also be detected by monitoring the length and/or update frequency of the SRD route selection list, regardless of the policy constructs used within the SRD route selection list, or alternatively by monitoring a particular policy construct (e.g., a prefix list). If the detected length oscillates (e.g., between a smaller and a larger number of entries), and/or if the update frequency is above a specified level, this may indicate churn, where successive SRD route selection lists instruct the addition and the removal of routes, respectively. Churn may alternatively be detected by monitoring the number of routes installed in the FIB. Successive drastic changes in the number of routes being installed in the FIB may be an indication for churn. Churn may further be detected indirectly by measuring the CPU time required for processing policy changes. Churn may be detected if the amount of time required for processing a policy change increases.

If no churn is detected, the method may directly proceed to Step 512. If churn is detected, the method may perform Step 504, 506, 508 or 510, or any combination thereof, prior to proceeding to Step 512.

In Step 504, the execution of the method is delayed for a specified duration. The delay may be fixed, or alternatively it may be variable, depending on the degree of churn. A higher degree of churn may result in a longer delay being implemented in Step 504, whereas a lower degree of churn may result in a shorter delay being implemented. Steps 512, 514 and 516 may only be executed after the delay has expired.

In Step 506, the SRD update frequency limit is lowered, in order to prevent future occurrences of churn. The adjusted update frequency limit may be sent to the SRD controller either immediately, or upon the next execution of Step 304.

In Step 508, a delay for the sending of flow data by the network device (Step 300) is implemented. Accordingly, subsequent execution of the method described in FIG. 3 may be delayed for at least the duration specified in Step 508.

In Step 510, the processing of churn-causing prefixes is temporarily suspended. Only a limited number of prefixes may be responsible for causing churn, whereas other prefixes may be stable. Accordingly, in accordance with an embodiment of the invention, the processing of these churn-causing prefixes is suspended, i.e., the current configuration of these prefixes in the FIB may be maintained, or alternatively, these prefixes may be blocked from being written to the FIB. The suspension may be maintained for a fixed time interval or until the route entries for these prefixes in the SRD route selection list appear to have stabilized.

In Step 512, the network device identifies the routes to be installed in the FIB, based on the SRD route selection list. The details of Step 512 are described in FIG. 6.

In Step 514, the network device updates the FIB. In one embodiment of the invention, routes provided by BGP and routes provided by other routing protocols are installed. If a route for a particular destination prefix is not available via BGP because no route for the destination prefix was included in the SRD routes list, but a route for the same destination prefix is provided by another routing protocol, the destination prefix may be installed in the FIB, even though the corresponding route was not selected by the SRD controller. Further, if an aggregate BGP route is available for a destination prefix, in addition to a BGP route for the same prefix, selected by the SRD controller, the aggregate route rather than the individual route selected by the SRD controller may be installed in the FIB. Step 514 may be performed in parallel with Step 516.

In Step 516, the network device advertises routes to the peer network devices. In one embodiment of the invention, the network device uses BGP to advertise the routes to peer network devices that support BGP. Regardless of the routing protocol that contributed a route installed in the FIB, the route may get advertised by the network device. Accordingly, even though a route may not have been selected by the SRD controller, the route may get advertised by the network device, if a route for the same destination prefix was provided by another routing protocol.

Figure 6:
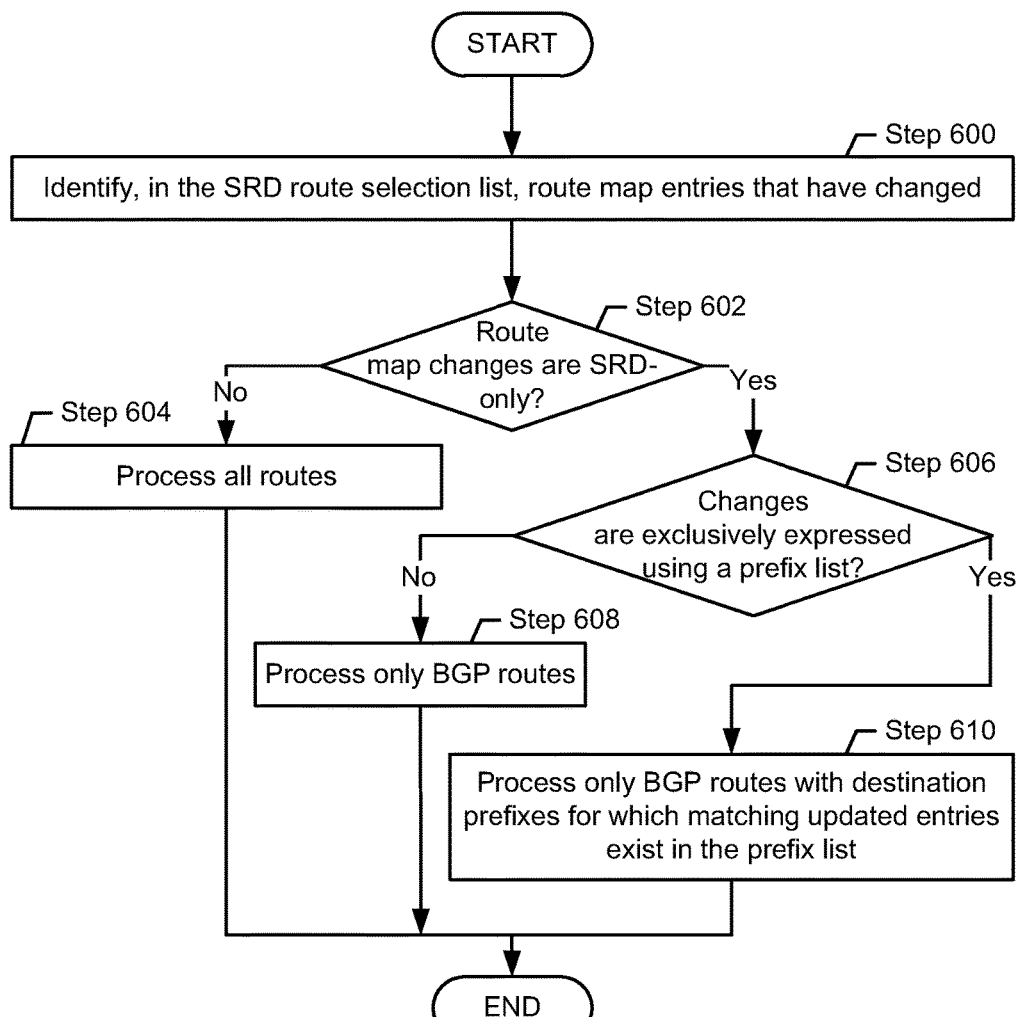
FIG. 6 shows a flowchart in accordance with one or more embodiments of the invention.

FIG. 6 shows a method for identifying routes to be installed in the FIB, based on the routes specified in the SRD route selection list.

In Step 600, the network device identifies, in the SRD route selection list, route map entries that have changed. The changed route map entries may be identified by comparison of the current SRD route selection list with a previous SRD route selection list. As previously described, various policy constructs may be used in the route map, depending on the policy constructs supported by the SRD controller. For example, the SRD controller may provide the SRD route selection list using, for example, prefix lists, AS path lists, BGP community lists, etc. Accordingly, route map entries may be based on various policy constructs. In one embodiment of the invention, changed SRD route selection list entries may have already been obtained in an earlier step of the method, e.g., in Step 500. In this case, Step 600 may be skipped.

In Step 602, a determination is made about whether the changes in the route map are SRD-only changes. In one or more embodiments of the invention, route maps may be used by the network device to convey route changes that are triggered by the SRD controller, based on an SRD route selection list. Route maps may however also be used by other (non-SRD) processes of the network device. For example, an updated route map may be issued by the system administrator. The route map may further be accessed for various purposes other than SRD changes. For example, route redistribution, and inbound and outbound policies may access the route map. Depending on whether the changes in the route map are exclusively attributed to the SRD route selection list, or alternatively include other changes that may be used by other (non-SRD) processes such as route redistribution across different routing protocols, different levels of processing, as further described below, may be necessary. If a determination is made that the updated route map is not exclusively a result of an updated SRD route selection list, the method may proceed to Step 604, where a comprehensive processing of routes that may also include non-BGP routes may be performed, as described below. If alternatively a determination is made that the changes in the route map are exclusively caused by an updated SRD route selection list, a limited processing of the routes may be performed, as described below. In this case, the method may proceed to Step 606. Whether changes in a route map are a result of an updated SRD route selection list may be determined by inspection of the route map itself, or by inspection of the notification that included the route map. For example, an identifier in the route map and/or in the notification may specify whether the route map was updated in order to implement SRD changes. Alternatively or additionally, the determination may be made based on whether the route map is accessed only for the purpose of updating the SRD changes, or alternatively whether it is also accessed by other processes.

In Step 604, a complete route processing that may include the processing of BGP and non-BGP routes may be performed to obtain a set of route candidates to be written to the FIB.

In Step 606, a determination is made about whether the changes in the route map are exclusively expressed using a prefix list. If the changes are not exclusively prefix list-based (e.g. if match clauses in the SRD route map require the identification of prefixes based on the AS path attribute), the method may proceed to Step 608. If the changes in the route map are exclusively prefix list-based, the method may proceed to Step 610.

In Step 608, all BGP route candidates, stored in the BGP RIB, are processed using the route map. The BGP route candidates may be processed by applying, to each BGP route candidate, the match clauses in the route map. The match clauses in the route map may be sequentially applied to a route candidate until an applicable match clause or a set of applicable match clauses is found, that either requires the installation of the route candidate in the FIB or blocks the route candidate from being installed in the FIB. In one embodiment of the invention, only a subset of all BGP route candidates, stored in the BGP RIB, need to be processed, if an index of the route attributes, based on which the matching is performed, and the prefixes is maintained. In this case, only routes that are identified based on attributes meeting match clause requirements may be processed.

In Step 610, only BGP route candidates with destination prefixes for which matching updated entries in the prefix list exist are processed. For example, if a new prefix entry in the prefix list is found, routes for reaching this prefix may be processed and installed in the FIB. Further, if a prefix entry in the prefix list is removed, routes for reaching this prefix may be removed from the FIB. In one embodiment of the invention, if the number of updated entries in the prefix list is smaller than the number of BGP route candidates in the BGP RIB, the routes to be programmed into the FIB are identified by shortlisting the BGP route candidates that match the updated entries in the prefix list. Subsequently, the shortlisted route candidates may be selected for installation in the FIB. Alternatively, if the number of BGP route candidates in the BGP RIB is smaller than the number of entries in the prefix list, the entries in the prefix list may be shortlisted based on existing matching BGP route candidates. Subsequently, the BGP route candidates corresponding to the shortlisted prefix list entries may be selected for installation in the FIB.

Embodiments of the invention may enable a network device to selectively install routes into the FIB of the network device. A network device in accordance with one or more embodiments may therefore be used in scenarios where the capacity of the network device's FIB is not sufficient to accommodate all possible routes.

The selection of routes to be installed may be made in a manner optimized for various specific scenarios. For example, the selection may be made such that routes toward destination IP addresses that receive a high volume of data packets are installed. A network device, configured accordingly, may therefore be able to process the majority of all traffic, encountered by the network device. Only traffic directed to rarely occurring destination IP addresses may not be processed. Alternatively, the selection may be made such that network traffic is distributed between multiple network devices. If the routes are distributed between multiple network devices operating functionally in parallel, all traffic may be handled by the combination of these network devices, in accordance with an embodiment of the invention.

Further, routes may be distributed between network devices such that traffic load is balanced between the network devices, i.e., such that highly used routes are distributed approximately equally between multiple network devices. In one embodiment of the invention, the distribution of routes between multiple network devices may be a more cost effective and/or higher bandwidth solution than the use of a single network device for all routes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for selective route download in network devices, the method comprising:
    obtaining, by a network device, a first selective route download (SRD) route selection list from an SRD controller, the first SRD route selection list comprising instructions that enable the network device to identify routes already present in a routing information base (RIB) to be installed in a forwarding information base (FIB) of the network device;
    updating a route map using the first SRD route selection list to obtain an updated route map;
    identifying, by the network device, a first route to be installed in the FIB, based on receiving the first SRD route selection list, wherein identifying the first route, comprises:
        identifying a plurality of changes in the updated route map;
        making a first determination that the plurality of changes in the updated route map are exclusively attributed to the first SRD route selection list;
        making a second determination that the plurality of changes in the updated route map are exclusively expressed using a prefix list; and
        based on the first and the second determinations:
            selecting the first route to be installed in the FIB from a border gateway protocol (BGP) RIB by processing only routes in the BGP RIB that have prefixes matching changed prefixes in the prefix list; and
    updating the FIB of the network device with the first route.

2. The method of claim 1, further comprising:
    obtaining, by the network device, a second SRD route selection list from the SRD controller;
    updating the updated route map using the second SRD route selection list to obtain a second updated route map;
    identifying, by the network device, a second route to be installed in the FIB, based on receiving the second SRD route selection list, wherein identifying the second route comprises:
        identifying a second plurality of changes in the second updated route map;
        making a third determination that the second plurality of changes in the second updated route map are exclusively attributed to the second SRD route selection list;
        making a fourth determination that the second plurality of changes are not exclusively expressed using a second prefix list; and
        based on the third and fourth determinations:
            selecting the second route to be installed in the FIB from the BGP RIB by processing all routes in the BGP RIB, using the second updated route map; and
    updating the FIB of the network device with the second route to be installed in the FIB.

3. The method of claim 1, further comprising:
    obtaining, by the network device, a second SRD route selection list from the SRD controller;
    updating the updated route map using the second SRD route selection list to obtain a second updated route map;
    identifying, by the network device, a second route to be installed in the FIB, based on receiving the second SRD route selection list, wherein identifying the second route comprises:
        identifying a second plurality of changes in the second updated route map;
        making a third determination that the second plurality of changes in the second updated route map are not exclusively attributed to the second SRD route selection list; and
        based on the third determination:
            selecting the second route to be installed in the FIB from all routes of the network device, using the second updated route map; and
    updating the FIB of the network device with the second route to be installed in the FIB.

4. The method of claim 1, further comprising, prior to obtaining the first SRD route selection list from the SRD controller:
    providing, by the network device, flow statistics to the SRD controller, wherein the flow statistics comprise counts of destination IP addresses; and
    providing, by the network device, route information to the SRD controller, wherein the route information comprises routes for destination prefixes suitable for reaching the destination IP addresses.

5. The method of claim 1, wherein updating the FIB of the network device with the first route to be installed in the FIB comprises installing the first route in the FIB.

6. The method of claim 1, further comprising:
    advertising routes, installed in the FIB, to peer network devices.

7. The method of claim 1, further comprising:
    making a third determination that the first route to be installed in the FIB causes churn; and
    based on the third determination, not installing the first route in the FIB.

8. The method of claim 1, further comprising:
    making a third determination that the first route to be installed in the FIB causes churn; and
    delaying, based on the third determination, the updating of the FIB of the network device with the first route to be installed in the FIB.

9. The method of claim 1, further comprising:
    making a third determination that a second route installed in the FIB is not covered by the updated route map; and
    based on the third determination, deleting the second route from the FIB.

10. A network device, comprising:
    a processor;
    a routing information base (RIB) agent executing on the processor and comprising a border gateway protocol (BGP) RIB;
    a memory, operatively connected to the processor, comprising a forwarding information base (FIB), wherein the RIB agent, when executing on the processor:
obtains a first selective route download (SRD) route selection list from an SRD controller, the first SRD route selection list comprising instructions that enable the network device to identify routes already present in the RIB to be installed in the FIB of the network device;
updates a route map using the first SRD route selection list to obtain an updated route map;
identifies a first route to be installed in the FIB, and, based on receiving the first SRD route selection list:
identifies a plurality of changes in the updated route map;
makes a first determination that the plurality of changes in the updated route map are exclusively attributed to the first SRD route selection list;
makes a second determination that the plurality of changes in the updated route map are exclusively expressed using a prefix list, and
based on the first and the second determinations:
selects the first route to be installed in the FIB from the BGP RIB by processing only routes in the BGP RIB that have prefixes matching changed prefixes in the prefix list; and
updates the FIB of the network device with the first route to be installed in the FIB.

11. The network device of claim 10, wherein the RIB agent, when executing on the processor:
obtains a second SRD route selection list from the SRD controller;
updates the updated route map using the second SRD route selection list to obtain a second updated route map; and
identifies a second route to be installed in the FIB, based on receiving the second SRD route selection list, wherein, to identify the second route to be installed in the FIB, the RIB agent:
makes a third determination that a second plurality of changes in the second updated route map are exclusively attributed to the second SRD route selection list;
makes a fourth determination that the second updated route map changes are not exclusively expressed using a second prefix list, and
based on the third and fourth determinations:
selects the second route to be installed in the FIB from the BGP RIB by processing all routes in the BGP RIB, using the second updated route map,
wherein, after the second route is selected, the second route is installed in the FIB.

12. The network device of claim 10, wherein the RIB agent, when executing on the processor:
obtains a second SRD route selection list from the SRD controller
wherein the second SRD route selection list provides further instructions for the network device to identify routes to be installed in the FIB of the network device;
updates the updated route map using the second SRD route selection list to obtain a second updated route map;
identifies a second route to be installed in the FIB, based on receiving the second SRD route selection list, wherein, to identify the second route, the RIB agent:
makes a third determination that a second plurality of changes in the second updated route map are not exclusively attributed to the second SRD route selection list; and
based on the third determination, selects the second route to be installed in the FIB from all routes of the network device, using the second updated route map,
wherein, after the second route is selected, the second route is installed in the FIB.

13. The network device of claim 10, wherein the network device, prior to the RIB agent obtaining the first SRD route selection list from the SRD controller, a flow statistics agent executing on the processor further:
provides flow statistics to the SRD controller, wherein the flow statistics comprise counts of destination IP addresses; and
provides route information to the SRD controller, wherein the route information comprises routes for destination prefixes suitable for reaching the destination IP addresses.

14. A non-transitory computer readable medium comprising instructions that enable a network device to:
obtain a first selective route download (SRD) route selection list from an SRD controller, the first SRD route selection list comprising instructions that enable the network device to identify routes already present in a routing information base (RIB) to be installed in a forwarding information base (FIB) of the network device;
update a route map using the first SRD route selection list to obtain an updated route map;
identify a first route to be installed in the FIB, based on receiving the first SRD route selection list, wherein, to identify the first route, the instructions further enable the network device to:
identify a plurality of changes in the updated route map;
make a first determination that the plurality of changes in the updated route map are exclusively attributed to the first SRD route selection list;
make a second determination that the plurality of changes in the updated route map are exclusively expressed using a prefix list, and
based on the first and the second determinations:
select the first route to be installed in the FIB from a border gateway protocol (BGP) routing information base (RIB) by processing only routes in the BGP RIB that have prefixes matching changed prefixes in the prefix list; and
update the FIB of the network device with the first route to be installed in the FIB.

15. The non-transitory computer readable medium of claim 14, further comprising instructions that enable the network device to:
obtain, by the network device, a second SRD route selection list from the SRD controller;
update the updated route map using the second SRD route selection list to obtain a second updated route map;
identify a second route to be installed in the FIB, based on receiving the second SRD route selection list, wherein, to identify the second route, the instructions further enable the network device to:
identify a second plurality of changes in the second updated route map;

make a third determination that the second plurality of changes in the second updated route map are exclusively attributed to the second SRD route selection list;
make a fourth determination that the second plurality of changes are not exclusively expressed using a second prefix list; and
based on the third and fourth determinations:
    select the second route to be installed in the FIB from the BGP RIB by processing all routes in the BGP RIB, using the second updated route map; and
update the FIB of the network device with the second route to be installed in the FIB.

16. The non-transitory computer readable medium of claim 14, further comprising instructions that enable the network device to:
obtain, by the network device, a second SRD route selection list from the SRD controller;
update the updated route map using the second SRD route selection list to obtain a second updated route map;
identify, by the network device, a second route to be installed in the FIB, based on receiving the second SRD route selection list, wherein, to identify the second route, the instructions further enable the network device to:
    identify a second plurality of changes in the second updated route map;
    make a third determination that the second plurality of changes in the second updated route map are not exclusively attributed to the second SRD route selection list; and
    based on the third determination:
        select the second route to be installed in the FIB from all routes of the network device, using the second updated route map; and
    update the FIB of the network device with the second route to be installed in the FIB.

17. The non-transitory computer readable medium of claim 14, further comprising instructions that enable the network device, prior to obtaining the first SRD route selection list from the SRD controller, to:
provide flow statistics to the SRD controller, wherein the flow statistics comprise counts of destination IP addresses; and
provide route information to the SRD controller, wherein the route information comprises routes for destination prefixes suitable for reaching the destination IP addresses.

* * * * *